US007662078B2

(12) United States Patent
Bomba et al.

(10) Patent No.: US 7,662,078 B2
(45) Date of Patent: Feb. 16, 2010

(54) METHOD FOR CREATING A UNIFORM NIP PRESSURE UTILIZING A COMPLIANT PRESSURE ROLLER

(75) Inventors: Richard D. Bomba, Rochester, NY (US); Nelson A. Blish, Rochester, NY (US)

(73) Assignee: SKC Haas Display Films Co., Ltd., Choongchungnamdo (KR)

( * ) Notice: Subject to any disclaimer, the term of this patent is extended or adjusted under 35 U.S.C. 154(b) by 387 days.

(21) Appl. No.: 11/757,436

(22) Filed: Jun. 4, 2007

(65) Prior Publication Data

US 2007/0232469 A1 Oct. 4, 2007

Related U.S. Application Data

(62) Division of application No. 10/795,010, filed on Mar. 5, 2004, now Pat. No. 7,258,654.

(51) Int. Cl.
*B29C 43/46* (2006.01)
*D21G 1/02* (2006.01)

(52) U.S. Cl. ............ 492/7; 492/10; 492/9; 492/2; 492/4; 492/5; 492/8

(58) Field of Classification Search ............ 492/5, 492/6, 7, 8, 16, 1, 2, 4, 9, 10; 264/40.5, 40.6, 264/314

See application file for complete search history.

(56) References Cited

U.S. PATENT DOCUMENTS

| 3,846,883 | A | 11/1974 | Biondetti | |
|---|---|---|---|---|
| 4,068,360 | A | 1/1978 | Freuler | |
| 5,101,544 | A | 4/1992 | Kubik | |
| 5,111,563 | A | 5/1992 | Brown et al. | |
| 5,146,664 | A | 9/1992 | Biondetti | |
| 5,286,245 | A * | 2/1994 | Schiel | 492/7 |
| 5,386,769 | A | 2/1995 | Rinne | |
| 5,534,117 | A | 7/1996 | Rocrig | |
| 5,702,337 | A | 12/1997 | Renn et al. | |
| 5,853,359 | A | 12/1998 | Grabscheid et al. | |
| 5,919,121 | A | 7/1999 | Küsters et al. | |
| 6,186,290 | B1 | 2/2001 | Carlson | |
| 6,659,926 | B2 * | 12/2003 | Haag | 492/7 |
| 6,681,905 | B2 | 1/2004 | Edmondson et al. | |
| 7,037,249 | B2 * | 5/2006 | van Haag | 492/2 |

(Continued)

FOREIGN PATENT DOCUMENTS

WO  WO 02/064886 A2  8/2002

(Continued)

*Primary Examiner*—Essama Omgba
(74) *Attorney, Agent, or Firm*—Edwin Oh

(57) ABSTRACT

The present invention provides a method for creating uniform pressure at a nip comprising the acts of providing a stationary inner core, pivotally mounting a plurality of shoes to the stationary inner core, creating a plurality of annular chambers wherein each of the shoes occupies one of the chambers. In addition, the method further provides filling each of the chambers with a magneto-rheological fluid, surrounding the plurality of chambers, shoes, and stationary inner core with a thin, metal, rotatable shell; detecting a deformation in the shell and changing a magnetic field in at least one of the chambers to change a viscosity of the magneto-rheological fluid to correct the deformation.

7 Claims, 5 Drawing Sheets

U.S. PATENT DOCUMENTS

| | | | |
|---|---|---|---|
| 7,182,721 B2 * | 2/2007 | van Haag | 492/6 |
| 7,258,654 B2 * | 8/2007 | Bomba et al. | 492/7 |
| 7,465,264 B2 * | 12/2008 | Bomba | 492/7 |
| 2002/0132712 A1 | 9/2002 | Meschenmoser | |
| 2005/0250632 A1 * | 11/2005 | Haag | 492/7 |
| 2008/0207418 A1 * | 8/2008 | Van Haag | 492/7 |
| 2009/0018002 A1 * | 1/2009 | Haag | 492/7 |

FOREIGN PATENT DOCUMENTS

| | | |
|---|---|---|
| WO | WO 03/035976 A1 | 5/2003 |

* cited by examiner

METHOD FOR CREATING A UNIFORM NIP PRESSURE UTILIZING A COMPLIANT PRESSURE ROLLER

CROSS REFERENCE TO RELATED APPLICATION

This is a Divisional of application Ser. No. 10/795,010, filed Mar. 5, 2004, now U.S. Pat. No. 7,258,654.

FIELD OF THE INVENTION

The present invention relates in general to pressure rollers, and in particular, to a compliant pressure roller which adjusts to deformation in a thin outer shell.

BACKGROUND OF THE INVENTION

In preparing certain substrates it is important that at least one surface have a smooth finish. Often this smooth finish requires very high tolerances. Prior art solutions to the problem of creating a smooth finish have not been completely satisfactory. One prior art solution has been to use elastomeric rollers. Elastomeric rollers, however, cannot be ground to the same high tolerance as metallic rollers.

Another prior art solution has used carrier webs having a smooth surface finish as a backing material for the substrate as it passes through the nip. A problem with this solution is that the carrier web usually must be discarded or recycled adding to the cost of the manufacturing process. Another problem is that the carrier web often wrinkles.

Using a roller having a metal sleeve with a smooth surface finish over an elastomeric backing is a possibility. This solution, however, also has drawbacks. The thin metal sleeve is subject to cracking after repeated use, especially along the margins.

One prior art solution is discussed in U.S. Pat. No. 5,146,664 (Biondetti). The solution proposed is a series of hydraulic pistons. These hydraulic pistons, however, operate on a thick outer shell to correct for beam deflections in the roller. An apparatus as disclosed would be expensive and not suitable for all applications.

For a patterned roller, a rapid pressure rise at a nip is important to force material to the pattern. Metallic shells of small diameter inherently will create a small nip footprint, for a given nip load, which results in a higher pressure. In the formation of extrusion cast web materials the nip action improves the replication of the polished or patterned roller surfaces.

In an ideal situation, rollers would be perfectly cylindrical and the molten resin would be uniformly distributed. In practice, neither condition is achieved. An ability to locally adjust roller shape is desirable to improve cross width nip loading. Consequently the web material will have more consistent thickness and surface uniformity. Self adjusting rollers are utilized in paper manufacturing or web calendaring operations which require high nip loads, but they have minimal heat transfer capabilities.

It is desirable to have a roller capable of creating a smooth finish, with a small nip footprint, having an improved heat transfer capability, and capable of adjustment.

SUMMARY OF THE INVENTION

Briefly, according to one aspect of the present invention a compliant pressure roller for creating uniform pressure at a nip has a stationary inner core. A plurality of shoes is pivotally mounted to the stationary inner core. Non-magnetic dividers create a plurality of annular chambers and one shoe occupies one of the chambers. A magneto-rheological fluid fills each of the chambers and a plurality of magnetic field generators changes a magnetic field in each of the chambers. A thin, rotatable shell surrounds the plurality of chambers, shoes, and stationary inner core. Changes in the magnetic field generators causes changes in the resistance of the magneto-rheological fluid, which in turn exerts force on the thin, rotatable shell, thus compensating for small deformities in the shell.

A pressure roller, according to the present invention has a thin walled metallic shell. The profile of the shell under load can be adjusted at various points along the rotation axis to provide a uniform contact nip. Regions are created along the axis of this roller in which the force exerted on the inner surface of the shell can be varied to compensate for forces that cause local shell deformation.

In an embodiment, a hydrodynamic force is created on the inner shell by the shearing action of a magneto-restrictive fluid contained within the chambers created between the inner shell and the outer shell. Changes to magnetic field affect the fluid viscosity. This generates a larger hydrodynamic force for a given rotation speed. The main components consist of an internal cylindrical core, spring loaded pivot shoes, zone separation rings, magnetic field source, and thin walled external shell.

A thin shell on the roller provides finer axial profile adjustment and superior heat transfer capability, which is important for extrusion casting systems. Improved heat transfer may allow for a smaller roller diameter which improves die to nip geometry and enables shorter melt curtain lengths. This can improve melt curtain thickness non-uniformity due to reduced neck-in. The roller can also be used on non-nip applications in which the surface of the roller with respect to another object needs to be adjustable.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
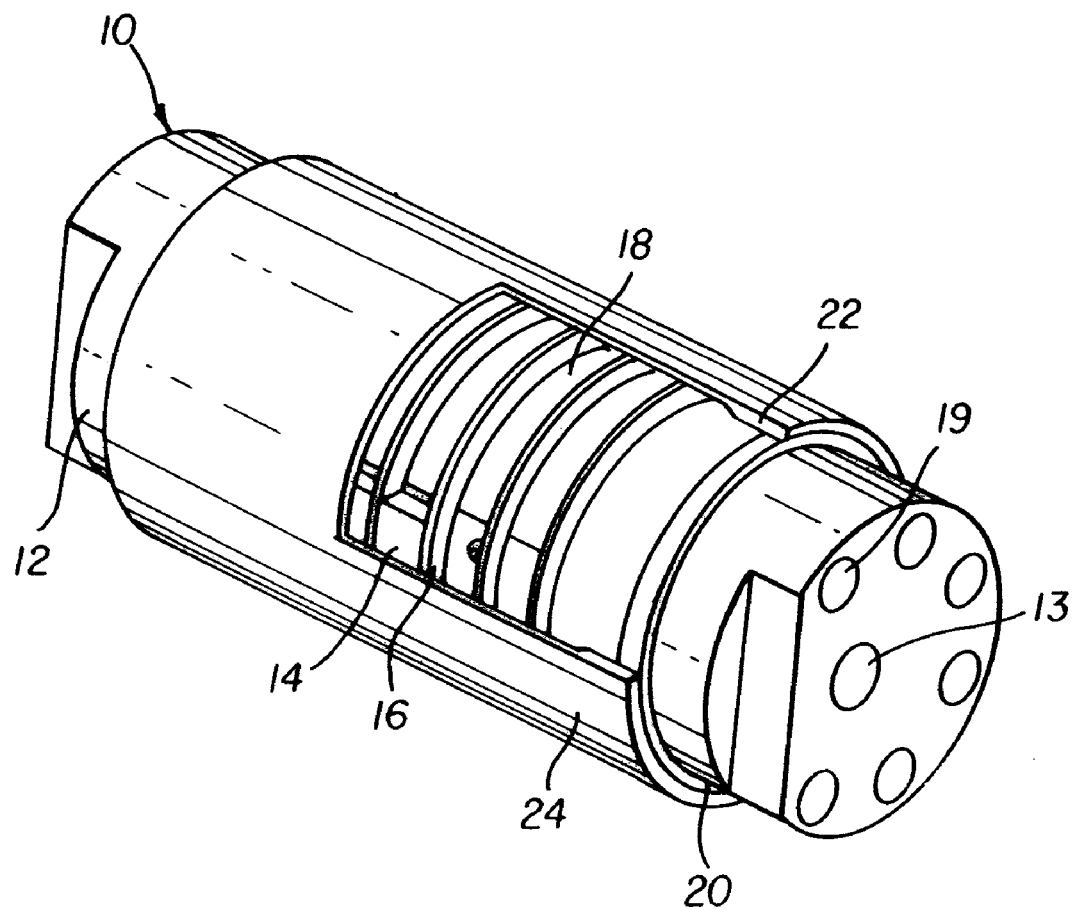
FIG. 1 is an isometric representation of an axially compliant pressure roller according to the present invention with a partial cross section taken through the outer shell to expose internal components.

Referring now to FIG. 1 a compliant pressure roller is referred to in general by numeral 10. Compliant pressure roller 10 is comprised in general of a stationary inner core 12 and a plurality of shoes 14 which are pivotally mounted to the stationary inner core 12. A series of non-magnetic dividers 16 create a plurality of annular chambers 18 and each of the shoes 14 occupies one of the annular chambers 18.

Figure 2A:
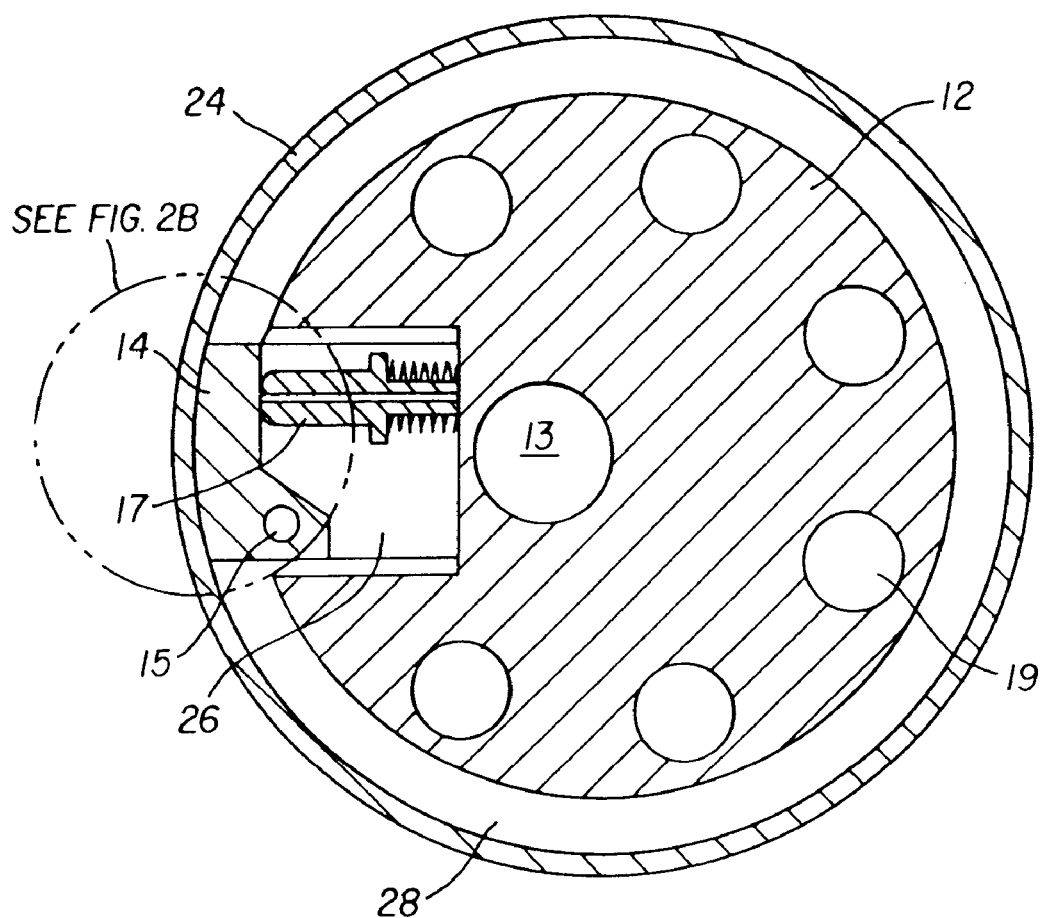
FIG. 2A is a cross section of the axially compliant pressure roller shown in FIG. 1 taken at the center of one of the internal flow chambers.
Figure 2B:
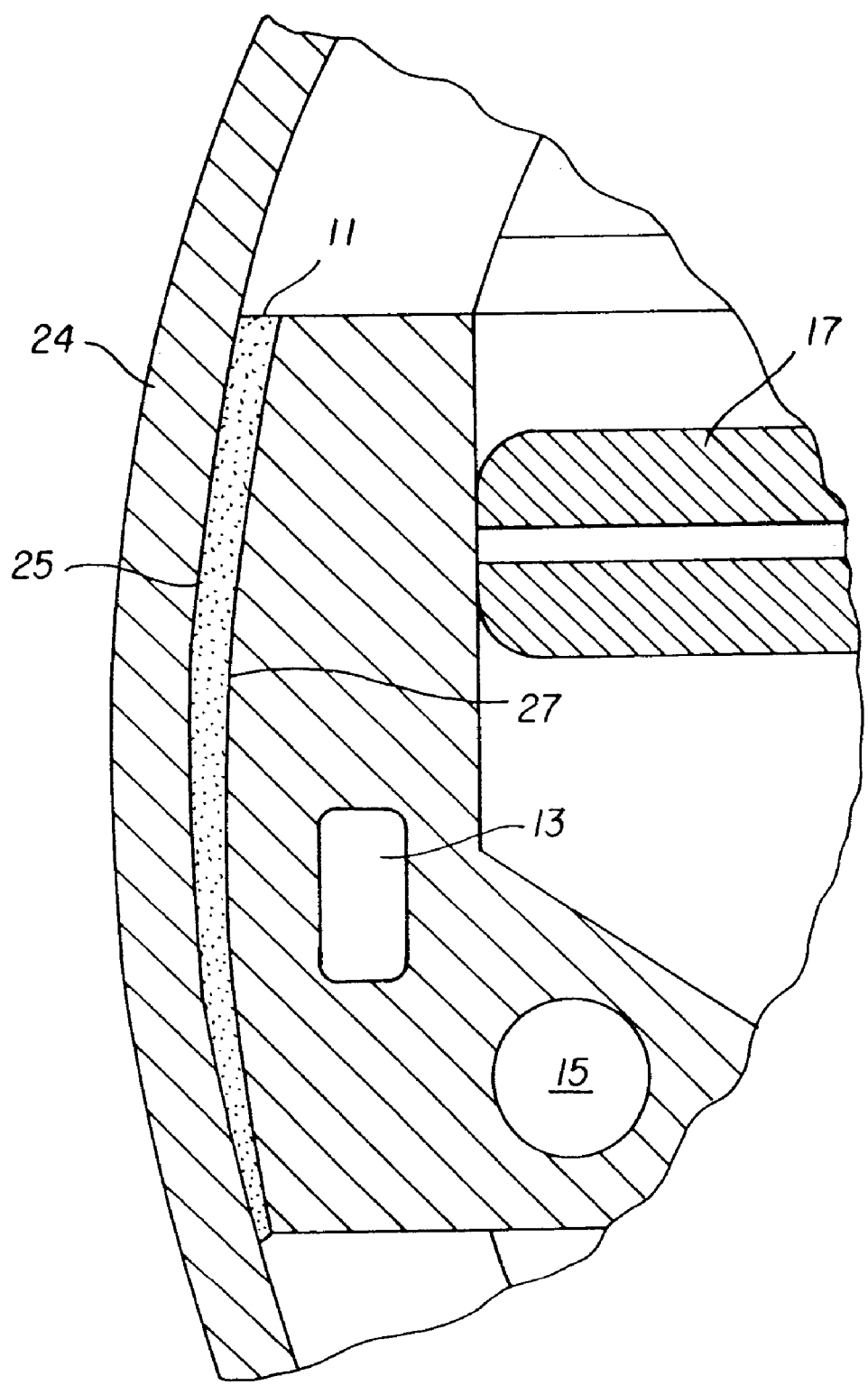
FIG. 2B is an enlarged view of the interface of the shoe and the outer shell as noted in FIG. 2A.

Referring to FIGS. 1, 2A, and 2B, shoe 14, which is eccentrically mounted, is shown. One surface of shoe 14 is curved. A pivot point 15 and spring loading assembly 17 are attached to shoe 14. A non-magnetic, metallic material is used in the construction of the shoe 14, but the present invention is not limited to this embodiment. The curvature of the face of the shoe 14 is slightly smaller than the curvature of the inner surface of the thin walled outer shell 24. This creates a converging cross section at the interface between these components.

The compliant pressure roller 10 comprises of a non-rotating inner core 12, which is the main support structure for the compliant pressure roller 10. A non-magnetic, metallic material is used in the construction of the inner core, but the present invention is not limited to this embodiment. The inner core 12 has a cylindrical form in which axial holes 19 have been provided. At least one of these holes is used to house the magnetic field generator 13. In the preferred embodiment one magnetic field generator 13 is associated with each of the plurality of shoes 14. This allows for local adjustments to the thin walled outer shell 24. In an alternate embodiment a magnetic field generator 13 may be located in each of the plurality of shoes 14 as shown in FIG. 2B.

Axial holes 19 are used for the circulation of heat transfer media within the core. A series of pockets 26 are created in a radial direction to serve as supports for the shoes 14. Seats on the inner core 12 enable mounting of bearings 20 and fluid seals 22.

In operation, the hydrodynamic effect of a viscous fluid subject to the shear stress created by the relative velocity of the thin walled shell with respect to the shoe, develops a pressure profile within the converging section 11. This pressure acts on the thin walled shell curved surface 25 and the curved surface 27 of the shoe. The pressure acting on the shoe results in a force normal to the curvature at the center of pressure. This force is resisted by the spring preloading force acting on the shoe 14. The pressure acting on the rotating thin walled outer shell 24 creates an internal force on the shell. The net difference in force acting on the shell from the internal hydrodynamic action and the external nip force will result in a localized deformation of the thin walled shell in this region.

A thin walled shell of small shell diameter is possible with this embodiment because the structural design of the shell is not dictated by beam bending criteria or shell crushing criteria. The wall thickness of the shell can be significantly thinner because the surface of the shell subjected to the external nip force is directly supported internally by the pressure created by the interaction of the magneto-rheological fluid 28 and the shoe 14.

The thin walled outer shell 24 is constrained with bearings 20 to rotate about the inner core 12. The rotation of the shell can be imparted by the friction force at the nip point 42, shown in FIG. 4, or with an external drive mechanism. Along the curved surface 25 of the thin walled shell, for a given convergent interface, relative velocity, and fluid viscosity create a uniform pressure. The annular chambers 18 in conjunction with the shoes 14, magneto-rheological fluid 28, and axially variable magnetic field generator 13 can be subjected to variable hydrodynamic pressure forces by changing the viscosity of the fluid. The ability to exert axially variable pressure along the thin walled shell results in localized deformation changes of small magnitude and at a much higher frequency than possible by other prior art.

Figure 3:
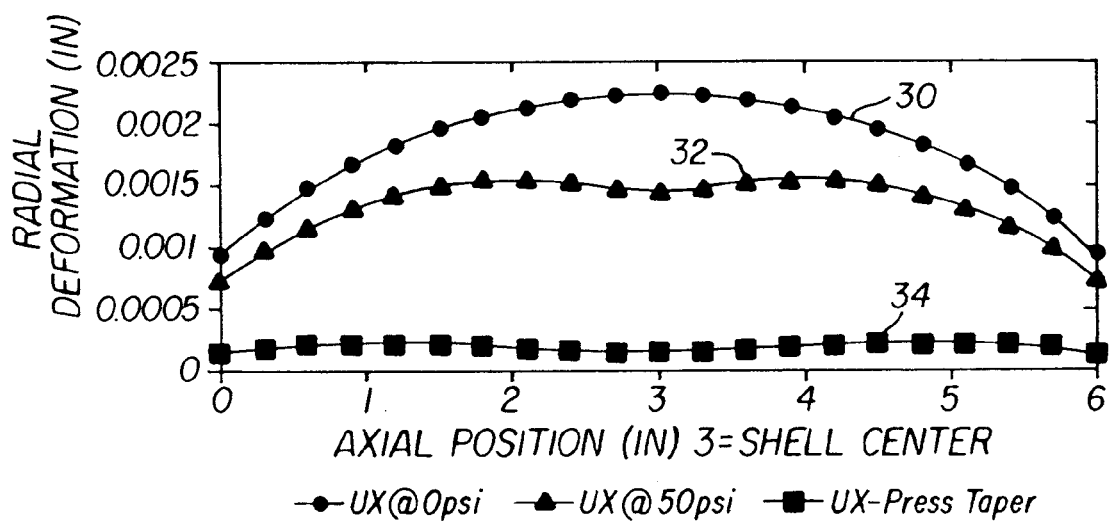
FIG. 3 is a graph of radial deformation (UX) of the outer shell normal to the nip point for various internal pressure conditions.

FIG. 3 shows the results of finite element calculations used to model the effect of the variable internal pressure capability of this apparatus on the radial profile of the roller surface in the nip point. The dimensions of the shell can be represented in terms of the following quantities; a flexural rigidity of approximately 1800 lb-in and a shell thickness to diameter ratio of 0.025. The flexural rigidity is defined as the quantity of the product of the material elastic modulus and the shell thickness cubed divided by the quantity of the product of a constant value 12 and the quantity of the difference of 1 and Poisson's ratio squared. An average nip pressure of 250 psi, placed on the thin walled outer shell 24 along a localized region parallel to the axis of rotation, has been used in this calculation. The variable (UX) is the radial displacement in the x-direction, which is also normal to the applied nip pressure region.

Curve 30 with diamond shaped markers represents the expected shell deformation under nip load but without internal support. Curve 32 with triangular shaped markers represents the effect of applying a localized pressure, on an area equivalent to the curved surface of the shoe 14 acting at the center of the shell with an average pressure of 50 psi. Curve 34 with rectangular shaped markers represents the positive effect on the radial deformation obtained by applying a gradient pressure profile along the inner surface of the shell ranging from 15 psi to 20 psi. Utilizing basic fluid dynamic principles it has been calculated that a pressure of approximately 30 psi can be developed in this region given a fluid of viscosity of approximately 10 Pa-s sheared between the outer shell and the curved surface of the shoe with an average shear rate of 250 1/s.

Figure 4:
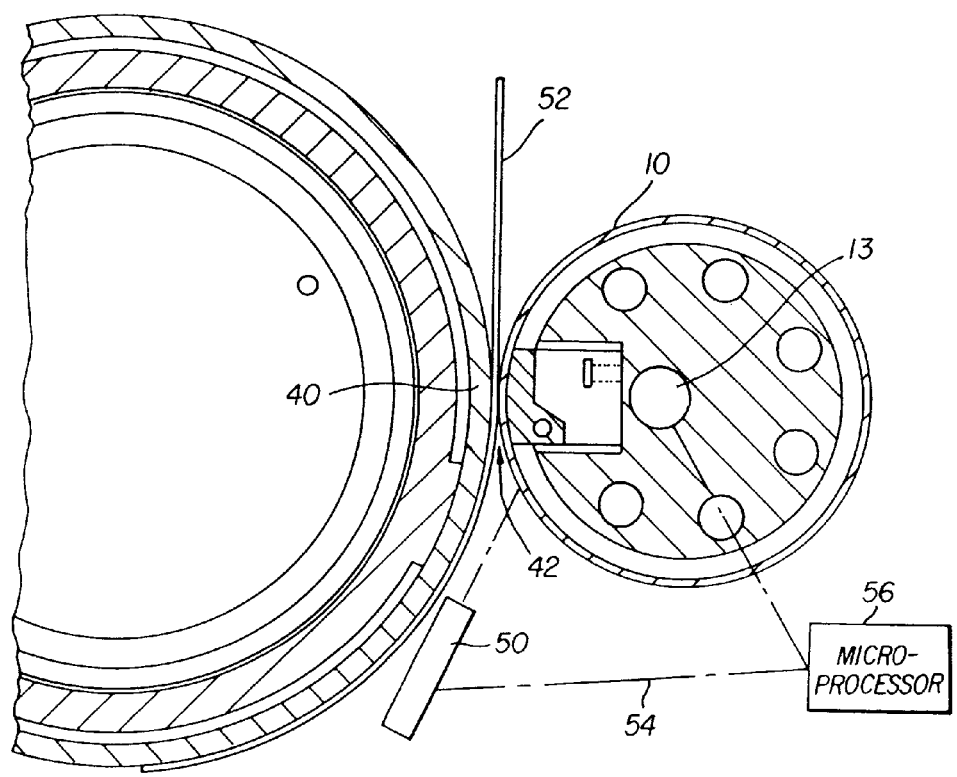
FIG. 4 is a cross section of a nip formed between two rollers

FIG. 4 shows a cross sectional view of a typical two roller nip utilized in the extrusion cast web formation. A compliant pressure roller 10 is loaded radially into the interface of the molten resin 52 and a second roller 40. Utilizing a non-contacting deformation detector 50 such as a laser triangulation gage or an eddy current device, the resulting shell surface deformation can be measured. This measurement data can be utilized to control internal loading conditions along the axis of the roller by sending a deformation signal 54 to microprocessor 56, which alters the strength of one or more of the magnetic field generators 13.

In addition to the magneto-rheological fluid described previously, this apparatus can accommodate other fluids without magneto-rheological properties but which exhibit non-Newtonian characteristics (viscosity of fluid is dependent on shear rate imposed). Localized pressure variations can be created through adjustment of the gap between the outer shell and the curved surface of the shoe. The average shear rate in this gap is proportional to the surface velocity of the shell divided by the gap height. Non-Newtonian fluids exhibit a logarithmic relationship between viscosity and shear rate. External manipulation of the gap combined with a fluid with desirable shear sensitive properties provides an additional means of creating localized pressure differences within each chamber.

The invention has been described in detail with particular reference to certain preferred embodiments thereof, but it will be understood that variations and modifications can be effected within the scope of the invention.

Parts List

10 compliant pressure roller
11 converging section
12 inner core
13 magnetic field generator
14 shoe 15 pivot point
16 non-metallic dividers
17 spring loading assembly
18 annular chambers
19 axial holes
20 bearings
22 seals
24 thin walled outer shell
25 curved surface, shell
26 pockets
27 curved surface, shoe
28 magneto-rheological fluid
30 curve
32 curve
34 curve
40 second roller
42 nip
50 deformation detector
52 molten resin
54 signal
56 microprocessor

The invention claimed is:

1. A method for creating uniform pressure at a nip comprising:
providing a stationary inner core;
pivotally mounting a plurality of shoes to said stationary inner core;
creating a plurality of annular chambers wherein each of said shoes occupies one of said chambers;
filling each of said chambers with a magneto-rheological fluid;
surrounding said plurality of chambers, shoes, and stationary inner core with a thin, metal, rotatable shell;
detecting a deformation in said shell; and
changing a magnetic field in at least one of said chambers to change a viscosity of said magneto-rheological fluid to correct said deformation.

2. A method as in claim 1 wherein a hydrodynamic force on said magneto-rheological fluid created by rotation of said shell compensates for deformation in said shell.

3. A method as in claim 1 wherein a magnetic field generator is mounted in each of said shoes.

4. A method as in claim 1 wherein said magneto-rheological fluid is a heat transfer agent.

5. A method as in claim 1 comprising the additional step of spring loading said shoes to said stationary inner core.

6. A method as in claim 1 wherein an eddy current detector detects deformation in said shell.

7. A method as in claim 1 wherein a laser detector detects deformation in said thin, rotatable shell.

* * * * *